US010037511B2

(12) United States Patent
Braham et al.

(10) Patent No.: US 10,037,511 B2
(45) Date of Patent: Jul. 31, 2018

(54) DYNAMICALLY ALTERING SELECTION OF ALREADY-UTILIZED RESOURCES

(71) Applicant: International Business Machines Corporation, Armonk, NY (US)

(72) Inventors: Adam D. Braham, Rochester, MN (US); Dennis D. Koski, Oronoco, MN (US); Doyle J. McCoy, Rochester, MN (US); Todd A. Mueller, Rochester, MN (US); Jeffrey A. Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 13/909,202

(22) Filed: Jun. 4, 2013

(65) Prior Publication Data

US 2014/0359628 A1    Dec. 4, 2014

(51) Int. Cl.
G06F 9/46 (2006.01)
G06Q 10/10 (2012.01)
G06Q 10/06 (2012.01)

(52) U.S. Cl.
CPC ....... *G06Q 10/105* (2013.01); *G06Q 10/0631* (2013.01)

(58) Field of Classification Search
CPC .................. G06F 9/461; G06F 9/4881; G06F 2209/5021; G06Q 10/0631; G06Q 10/105
USPC ......................................... 718/100, 102, 103
See application file for complete search history.

(56) References Cited

U.S. PATENT DOCUMENTS

| 5,111,391 | A * | 5/1992 | Fields | G06Q 10/06 705/7.14 |
| 6,560,628 | B1 * | 5/2003 | Murata | G06F 9/4887 718/100 |
| 7,448,036 | B2 * | 11/2008 | Brenner et al. | 718/103 |
| 7,752,508 | B2 | 7/2010 | Hite et al. | |
| 7,752,622 | B1 * | 7/2010 | Markov | 718/103 |
| 7,787,609 | B1 * | 8/2010 | Flockhart | H04M 3/5233 379/265.01 |
| 8,136,114 | B1 | 3/2012 | Gailloux et al. | |
| 8,214,836 | B1 * | 7/2012 | Markov | 718/103 |
| 8,645,182 | B2 * | 2/2014 | Johnson | G06Q 10/109 705/7.13 |
| 2002/0083117 | A1* | 6/2002 | Goddard | 709/103 |
| 2003/0152212 | A1* | 8/2003 | Burok | G06Q 10/06 379/265.02 |

(Continued)

OTHER PUBLICATIONS

DiPippo, L. Cingiser, et al. "A scheduling service for a dynamic real-time CORBA system." Computer Software and Applications Conference, 1998. COMPSAC'98. Proceedings. The Twenty-Second Annual International. IEEE, 1998. p. 1-6.*

(Continued)

*Primary Examiner* — Meng Ai T An
*Assistant Examiner* — Willy W Huaracha
(74) *Attorney, Agent, or Firm* — David B. Woycechowsky (57) ABSTRACT

An approach to control workflow so that a relatively high priority work item can sometimes be automatically controlled by software to interrupt work being performed, by one or more resource unit(s), on a relatively lower priority work item. The analysis for deciding whether or not an interruption occurs depends upon interruptibility scalars (that is, interruptibility quotients and/or factors) and interruptibility threshold(s).

12 Claims, 5 Drawing Sheets

(56) References Cited

U.S. PATENT DOCUMENTS

| | | | |
|---|---|---|---|
| 2004/0158568 A1 | 8/2004 | Colle et al. | |
| 2007/0136731 A1* | 6/2007 | Bennington | G06Q 10/00 718/103 |
| 2009/0125909 A1 | 5/2009 | Li et al. | |
| 2009/0138682 A1* | 5/2009 | Capps, Jr. | G06F 9/30101 712/220 |
| 2009/0199192 A1 | 8/2009 | Laithwaite et al. | |
| 2010/0242041 A1* | 9/2010 | Plondke | G06F 9/3851 718/103 |
| 2012/0010912 A1 | 1/2012 | Lele et al. | |
| 2012/0053977 A1* | 3/2012 | Bagheri | G06Q 10/063112 705/7.14 |

OTHER PUBLICATIONS

Hao et al. "A Requirement Change Driven Software Project Human Resource Rescheduling Method", Computer Applications and Software, vol. 28 No. 6, Jun, 2011, © 1994-2012 China Academic Journal Electronic Publishing House, All rights reserved. <http://www.cnki.net>.

IBM, "A Method for using Mathematical Optimization to Allocate and Reallocate Geographically Distributed, Reconfigureable Resources with Spatial Considerations and Time Windows", IP.com Prior Art Database, IPCOM000029967D, Jul. 20, 2004, <http://www.ip.com/pubview/IPCOM000029967D>.

\* cited by examiner

FIG. 10 ively worked on by assigned resource unit(s); (ii) an incoming work item has not yet been actively worked on; and (iii) an interrupted work item has been actively worked on, but is not currently being actively worked on.

DYNAMICALLY ALTERING SELECTION OF ALREADY-UTILIZED RESOURCES

FIELD OF THE INVENTION

The present invention relates generally to the field of workflow routing in a work-to-resource environment.

BACKGROUND OF THE INVENTION

Basic workflow routing in a work-to-resource environment is accomplished through criteria and constraint calculations and decisions. Typically, work is assigned to a resource until that resource completes the assigned work and is therefore ready to receive new work.

SUMMARY

According to an embodiment of the present invention, there is a method for helping to control workflow in an environment including a first resource unit, first non-in-progress work item and a first in-progress work item. The first in-progress work item is being worked upon by the first resource unit. The method includes the following steps (not necessarily in the following order): (i) calculating a first interruptibility scalar for the first non-in-progress work item relating, at least in part, to characteristics of the first non-in-progress work item; (ii) calculating a second interruptibility scalar for a first in-progress entity relating, at least in part, to characteristics of the first in-progress work item and/or the first resource unit; and (iii) comparing the first interruptibility scalar to the second interruptibility scalar to determine whether the first non-in-progress work item is qualified to interrupt the first in-progress work item. At least the calculating-a-first-interruptibility-scalar step and the calculating-a-second-interruptibility-scalar step are performed by computer software running on computer hardware.

According to a further aspect of the present invention, a computer program product helps control workflow in an environment including a first resource unit, a first non-in-progress work item and a first in-progress work item. The first in-progress work item is being worked upon by the first resource unit. The product includes software stored on a software storage device. The software includes: (i) first program instructions programmed to calculate a first interruptibility scalar for the first non-in-progress work item relating, at lease in part, to characteristics of the first non-in-progress work item; (ii) second program instructions programmed to calculate a second interruptibility scalar for a first in-progress entity relating, at least in part, to characteristics of the first in-progress work item and/or the first resource unit; and (iii) third program instructions programmed to compare the first interruptibility scalar to the second interruptibility scalar to determine whether the first non-in-progress work item is qualified to interrupt the first in-progress work item. The software is stored on a software storage device in a manner less transitory than a signal in transit.

According to a further aspect of the present invention, a computer system helps control workflow in an environment including a first resource unit, a first non-in-progress work item and a first in-progress work item. The first in-progress work item is being worked upon by the first resource unit. The system includes: (i) a processor(s) set; and (ii) a software storage device. The processor set is structured, located, connected and/or programmed to run software stored on the software storage device. The software includes: (i) first program instructions programmed to calculate a first interruptibility scalar for the first non-in-progress work item relating, at least in part, to characteristics of the first non-in-progress work item; (ii) second program instructions programmed to calculate a second interruptibility scalar for the first in-progress entity relating, at least in part, to characteristics of the first in-progress work item and/or the first resource unit; and (iii) third program instructions programmed to compare the first interruptibility scalar to the second interruptibility scalar to determine whether the first non-in-progress work item is qualified to interrupt the first in-progress work item.

DETAILED DESCRIPTION

The DETAILED DESCRIPTION section will be divided into the following sub-sections: (i) General Explanations And Pertinent Terminology; (ii) The Hardware and Software Environment; (iii) Operation of Embodiment(s) of the Present Invention; and (iv) Definitions.

I. General Explanations and Pertinent Terminology

First some terminology will be introduced. An entity that performs work is called a resource unit. A resource unit may be, but does not have to be, a human being. A resource unit that is human may be referred to as a human resource unit. In some embodiments, there may be different classes, levels, types, etc. of resource units such that not all resource units are interchangeable and/or equivalent. The work, which is performed by the resource units, is itself divided into portions called work items. In some embodiments, there may be different classes, levels, types, etc. of work items such that not all work items are interchangeable and/or equivalent. Work item status can have at least the following values: (i) an in-progress work item is currently being actively worked on by assigned resource unit(s); (ii) an incoming work item has not yet been actively worked on; and (iii) an interrupted work item has been actively worked on, but is not currently being actively worked on.

A "work item interruptibility quotient" is a scalar assigned to a work item which reflects the priority of that work unit, with a high priority generally having a low interruptibility quotient and vice versa. Some embodiments also include "resource unit interruptibility quotients," which is a scalar assigned to a resource unit which reflects the importance (or priority) of maintaining that resource unit at work upon that resource unit's current in-progress work item, with a high importance of maintaining the resource unit at work on its current work item having a correspondingly low interruptibility quotient and vice versa. Although there are many possible embodiments of the present invention, embodiments will generally have separate interruptibility quotients for at least two of the following: (i) incoming work items; (ii) resource units; (iii) in-progress work units; and/or (iv) interrupted work items. Some embodiments will have separate interruptibility quotients for an in-progress work item and the resource unit working on that in-progress work unit. Other embodiments will have a single interruptibility quotient (herein referred to as a "hybrid in-progress interruptibility quotient") that is dependent upon both of the following: (i) the characteristics of the resource unit; and (ii) the characteristics of the in-progress work item that the resource unit is currently-working on.

Systems according to the present invention can be designed so that the interruptibility-related scalars: (i) increase as easy susceptibility to interruption increases (in these types of systems, the interruptibility scalar will usually be referred to herein as an "interruptibility quotient"); or (ii) decrease as easy susceptibility to interruption increases (in these types of systems, the interruptibility scalar will usually be referred to herein as an "interruptibility factor"). Interruptibility quotients and/or factors, collectively, will herein be referred to interruptibility scalars. However, it is noted that embodiments discussed herein that use interruptibility quotients can generally be easily modified to use interruptibility factors and vice versa.

In some embodiments, when an incoming work item has a work item interruptibility quotient that is sufficiently lower than the work item interruptibility quotient of an in-progress work item, then the following things (herein collectively called an "interruption") will happen: (i) work on the in-progress work item by its assigned resource unit(s) will at least temporarily cease; (ii) work on the incoming work item will be started by the resource unit(s) that had been assigned to at least temporarily ceased work item; (iii) the status of the temporarily ceased work item will change to interrupted; and (iv) the status of the incoming work item will change to in-progress.

When it was stated above that the interruptibility quotient needed to be "sufficiently lower" to cause an interruption, the qualifier "sufficiently" referred to the fact that, in some embodiments, there is an interruptibility threshold which is a predefined amount by which one work item's interruptibility quotient must be lower than another work item's interruptibility quotient in order to cause an interruption. In embodiments that use non-zero interruptibility thresholds, these interruptibility thresholds may be static or dynamic. For example, in some embodiments, it may be optimal to make work generally more interruptible at certain times of the day, or certain times within a work shift. These kinds of dynamic changes in interruptibility can be accomplished by dynamically changing the interruptibility threshold at appropriate times.

Some embodiments of the present invention: (i) provide a method to determine whether a new unassigned item of work is of a sufficiently high perceived priority such that it should interrupt a resource currently doing lower priority work; (ii) provide methods that reduce or avoid the need for manual determination and intervention, by human workers, in locating a resource that can be interrupted from low priority work in order to perform higher priority work; (iii) reduce, or eliminate, the practice of choosing to forbid teams, or other resources, from working on various work tasks of relatively low priority, or value, in order to (inefficiently) maintain these resources as available to respond to anticipated high priority work; (iv) provide an efficient manner of ongoing work distribution which includes resources already being utilized, which is sometimes herein referred to as the interrupt concept; and/or (v) can apply to many human-based resource environments, such as contact centers (customer items of work to agent resource units) or medical facilities (patient-related items of work to doctor/nurse resource units).

Some embodiments of the present invention determine potential interrupt quotients for items of work in a queue, as a comparison factor against resources already busy with items of work. These embodiments: (i) normalize interruptibility quotient calculations of incoming work items and in-progress items; (ii) use interruptibility quotients and/or thresholds to determine if a new high priority item of work is a candidate to interrupt a resource working on a lower priority item of work; and/or (iii) in response to an "interrupt condition," determine the best resource eligible to interrupt based on additional criteria and constraints.

Some embodiments of the present invention include an unassigned work queue that: (i) is subject to queue management and monitoring; (ii) has interruptibility quotients assigned to work items (that is, incoming work items and/or interrupted work items) in the unassigned work queue; and (iii) contains incoming and/or interrupted work items (such as, live calls, electronic problem records, chats, discussion updates, knowledge work, etc.) that are currently unassigned as a result of a lack of immediately available resources to which the work item can be given. Generally, the unassigned work queue will include at least one of the following types of work items: (i) incoming; and/or (ii) interrupted.

In some embodiments, the identity and/or status of a resource unit will affect the interruptibility quotient of the work item upon which the resource unit is currently working. In other embodiments, the identity and/or status of a resource unit will not affect the interruptibility quotient of the work item upon which the resource unit is currently working. For example, relative seniority of a resource unit might be used to marginally raise the interruptibility quotient of that resource unit's current in-progress work item because the seniority of the resource unit may allow it to more easily and seamlessly handle interruptions. This example is one form of determining an interruptibility quotient for a work item based, in part, on identity of the resource unit. As a further example, the fact that a resource unit is near the beginning of her shift might be considered in calculating her current work item's interruptibility quotient, which would be one form of determining an interruptibility quotient of a work item based, in part, on status of the resource unit.

In some embodiments, the interruptibility quotient for each work item is determined based, at least in part, upon attributes of the work unit and other business rules. The interruptibility quotients and/or associated interruptibility thresholds for decision-making: (i) effectively normalize all types of work against a common and comparable priority basis; and/or (ii) determine when an item of work becomes high enough in priority (that is, low enough in its interruptibility quotient) that it is a candidate to interrupt a resource unit working on a lower priority (that is, high interruptibility quotient) work item.

In some embodiments, at any given time, resource pool includes: (i) all known resources in the system capable of handling work; and (ii) information indicating which item(s) of work (if any) each resource is working on. In some embodiments: (i) attributes for each resource's work item are used to normalize the interruptibility quotient, in a consistent way across the work items, system-wide; and (ii) interruptibility quotients and/or interruptibility thresholds indicate when an interruption will occur.

In some embodiments, the interruptibility quotients are dynamic because they are subject to real time change based on changing conditions. Dynamic interruptibility threshold (as discussed above) will make all in-progress work items, system-wide, more or less interruptible. On the other hand, dynamic interruptibility quotients will make a given work item more or less interruptible (for an in-progress work item) or more or less prone to interrupt other work items (for an incoming or interrupted work item).

In some embodiments, each work item's dynamic interruptibility quotient is intermittently re-calculated throughout its life cycle. The interruptibility quotient is dynamic in that interruptible factors change over time to meet business requirements. For instance, as new work enters the system and ages, the level of importance may be increased due to business rules such as call response criteria, subsequently driving the level of need high enough to drive an interrupt before the expiration of the work's commitment.

Each in-progress work item's interruptibility quotient is also calculated throughout its life cycle, in much the same way. This allows the system to dynamically change the resource task interrupt quotient. For instance, in some embodiments, an in-progress work item that has just been assigned to a resource is initially not deemed interruptible by any work, but over time it may change and rise up to a value where the in-progress work item is now considered interruptible. For example, assume that: (i) interruptibility quotients may have values between 0 and 1; (ii) the interruptibility threshold is set at 0.5; and (iii) a given in-progress work item has an interruptibility quotient of 0.4 at a given time. Under these assumptions, the in-progress work item will not be interruptible because even an incoming or interrupted work item having an interruptibility quotient of zero (that is, highest possible priority) will not be less than the 0.4 interruptibility quotient of the in-progress item by at least the threshold amount of 0.5. However, if the interruptibility quotient of the in-progress item is calculated to rise above 0.5, then it conceivably could be interrupted by an incoming or interrupted work item with a sufficiently low interruptibility quotient.

While the foregoing discussion has only discussed interruptibility thresholds where the threshold applies to the difference in interruptibility quotients between two work items, it is possible, alternatively or additionally to have an absolute interruptibility threshold (independent of any difference-based threshold) where in-progress work items below the absolute interruptibility threshold cannot be interrupted. In these absolute interruptibility threshold embodiments, when an incoming work item has attained sufficiently high priority (that is, low enough interruptibility) to qualify to interrupt an in-progress work item, then the best match for making an interruption to an in-progress work item will be determined based on criteria and constraints.

Work items have additional attributes that define what type of skill (or skills) are required to handle the task, such as expertise area (queue), language, and ownership. Resources are defined by their skill sets, availability schedule, current state, and current tasks. They may also contain personal constraints that affect a work item's interruptibility quotient, as discussed above.

A resource unit may be effectively determined to be interruptible, based upon the interruptibility quotient of the work upon which the resource unit is currently working. In that case, the resource unit is eligible to receive higher priority work (that is, work with a sufficiently lower interruptibility quotient). However, in situations where multiple resource units are effectively determined to be currently interruptible, the system may make additional comparisons to find the best matched resource unit to receive the work unit qualifying to cause that interrupt. Business constraints, such as business rules that define which types of work can interrupt other types of work, may be considered. In some embodiments, factors such as skills needed, language, and relative priority of the work being performed are matched against the requirements of the interrupting work unit (that is, the incoming or interrupted work unit that is causing the interrupt condition to exist).

In some embodiments, there will be additional preconditions for making an interrupt, and these preconditions may mirror pre-conditions conventionally considered in conventional non-interruptible work flow schemes. For example, if a new live call is a candidate to interrupt a resource and requires database skills and speaks German, it must use those criteria to find a resource that is working on a task that can be interrupted and has these skills. If two or more resources match that criteria, further constraints such as time of day, availability schedule or ownership may need to be considered, or use the interruptible quotient to determine who is working on the lowest priority task. If no matches are found after due consideration of interruptibility quotients (and associated interruptibility thresholds) and all other applicable work item assignment preconditions, then: (i) no interruption will occur (at least absent active, ad hoc human intervention in systems which make that avenue possible); and (ii) the unassigned work must continue to wait as an incoming-status work item.

If there is no direct match in finding the appropriate resource to interrupt, the system can be designed to make smart concession decisions. For example, the unassigned high priority work required both database and networking skills. If the system finds a resource that is interruptible and only has database skills, the choice might be to do the interrupt anyway because the unit of work may be on the verge of its expiration threshold.

Some embodiments provide a mechanism that, upon the preconditions that concessions are necessary or no resources are interruptible, report back to the customer an option to continue waiting or offer to convert the work into a different communication type that may allow the system to find a more responsive interrupt. For example, assume that agents are flooded with work items in the form of live phone calls, but if the work items can be converted to online chat work items, then the converted chat items may be finished more quickly than they would have been if they remained as live call work items.

Some embodiments provide a workload distribution of both high and low priority work to available resources in order to optimize having a resource pool that has interruptible resources at any given time. These items may purposely give "knowledge work" to a couple of resource units, so that they are busy doing something, but are easily available to be interrupted with high priority (that is, low interruptibility) incoming work item(s) should such item(s) arise.

Some embodiments of the present invention may have one or more of the following features:

(i) a methodology and algorithm to automate and/or standardize the real-time managing of scheduling exceptions;

(ii) a primary focus not on addressing the initial scheduling and/or rescheduling of unassigned tasks to available resources, either for current assignment or future assignment;

(iii) a primary focus on scheduling exceptions or "misses" which occur from whatever scheduling processes/tooling is being used;

(iv) a methodology to expand the possible resource pool to handle these scheduling exceptions by including currently assigned and/or unavailable agents and calculating and comparing their current task(s) with the unassigned and expired/expiring task;

(v) a methodology for an integration of scheduling functionality and monitoring/alerting functionality;

(vi) monitoring functionality to identify in real-time when an unassigned task has expired or is ready to expire (for example, due to contractual terms and conditions, prior commitments, priority, severity, availability, etc.)—this is herein sometimes referred to as Work Queue Manager which will identify these scheduling exceptions and determine which are eligible as interrupt candidates and calculates the appropriate interrupt quotient of each eligible work item;

(vii) scheduling functionality to identify currently unavailable resources which are able to handle the request (for example, with the required skills, language, location, etc.)—this is sometimes referred to herein as the Resource Pool Manager which: (a) evaluates the current resource pool (including currently available and unavailable resources), (b) identifies which resources are eligible as an interruptible resource, and (c) calculates the interrupt quotient of each eligible resource;

(viii) a methodology for analyzing the eligible tasks from the Work Queue Manager and the interruptible resources from the Resource Queue Manager to determine which of these eligible tasks can be assigned to any of the eligible resources—this is sometimes referred to herein as the Interrupt Processor which attempts to match these tasks with the best available resource able to handle the task;

(ix) a Resource Interrupt generated to identify the task to be handled by the selected resource unit(s); and/or (x) methodology to automate and standardize one or more of the following processes: (a) identifying scheduling exceptions of expired/expiring work items, (b) evaluating the status of all currently available and unavailable resource units, (c) determining the interruptibility of each in-progress work item, currently being worked on by resource unit(s), using a standardized calculation based on the currently assigned work items, (d) determining the best candidate resource based on the calculation, (e) automatically triggering an escalation to notify, and/or (f) recommending and/or assigning the new work item to an identified resource unit.

Some (not necessarily preferred) embodiments of the present invention may be applicable to managing a mobile work force so the threshold conditions and calculations for work interruption are based primarily on physical location and proximity of the resources to the unassigned tasks. However, other embodiments of the present invention include a broader set of parameters and conditions within their respective algorithms to determine: (i) when to interrupt a busy resource unit; and/or (ii) how to find the best-fit for the unassigned task.

Some algorithms according to the present invention may include one or more of the following features:

(i) additional flexibility in defining the list of interrupt-eligible work items and/or resource units, utilizing skill level, language, type and/or communication method of task, physical location, time zone coverage, etc.;

(ii) additional flexibility in defining the list of interrupt-eligible work items, utilizing contract terms and conditions, response and or fix time requirements, priority, severity, resource availability, etc.;

(iii) additional flexibility in calculating and determining the interruptibility of in-progress work items, utilizing an algorithm to calculate an interrupt quotient of both the eligible work items, and of the eligible resource units;

(iv) the comparison of the interrupt quotient of the eligible tasks to the interrupt quotient of the eligible resources is used to determine: (a) whether the eligible task can interrupt an eligible resource with the new task, and/or (b) the best fit resource from the eligible resource list;

(v) specification of a relatively higher priority item can wait, or must always be given to a best-fit resource immediately;

(vi) allowing a higher priority item to wait (if its threshold/priority does not exceed the interrupt quotient of any of the busy resources) until the dynamic conditions of the resource have changed, over time, in hope of finding a "better fit" work item that can be interrupted;

(vii) this quotient is variable on both sides (work list and resource pool), and we optimize when the work crosses a threshold of a resource that the current task is interruptible with a higher priority task;

(viii) accounting for the status and/or identity of the resource unit in determining an interruptibility quotient (specifically, either an interruptibility quotient for the work item that the resource unit is currently working on, or an interruptibility quotient dedicated to the resource unit itself and separate from the interruptibility quotient that the resource unit is currently working on); and/or (ix) basing interruptibility decisions upon interruptibility differences between two (or more) interruptibility quotients (for example, an interruptibility quotient for an incoming work item and an interruptibility quotient for an in-progress work item).

II. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program, in form other than as a signal per se, for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
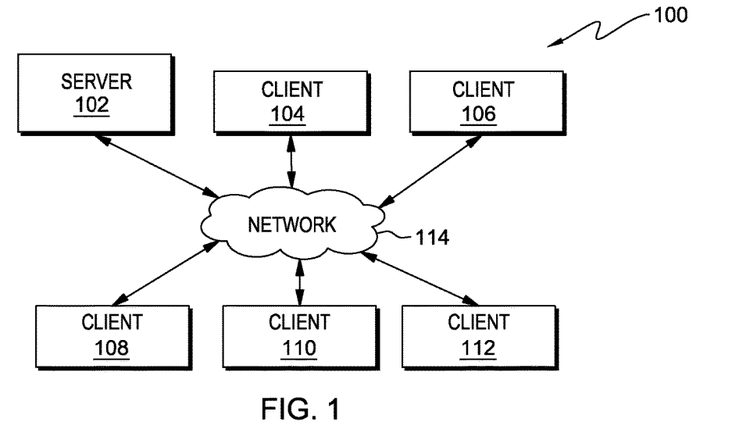
FIG. 1 is a schematic view of a first embodiment of a computer system (that is a system including computer(s)) according to the present invention.
Figure 2:
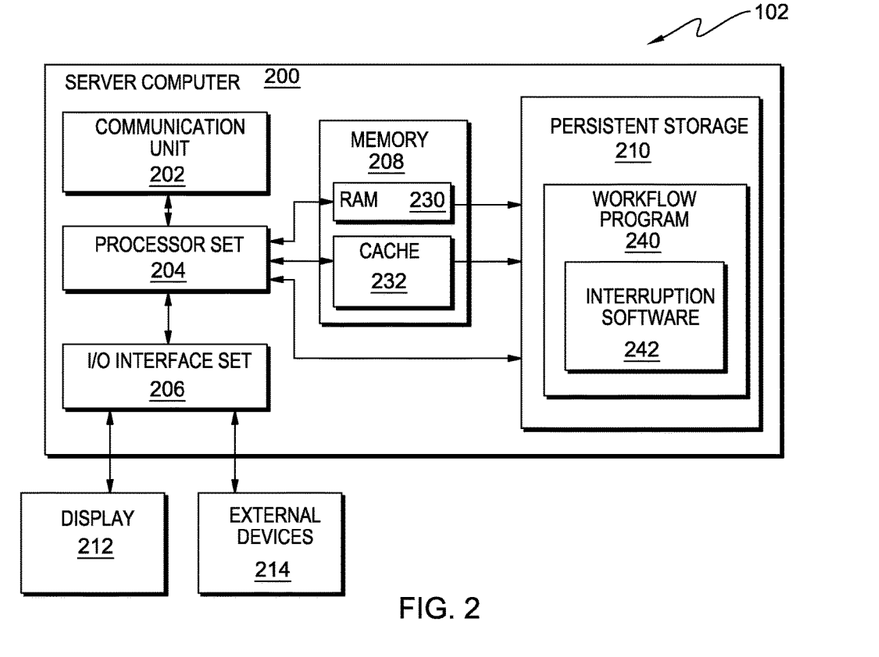
FIG. 2 is a schematic view of a portion of the first embodiment computer system.

The present invention will now be described in detail with reference to the Figures. FIGS. 1 and 2, collectively, make up a functional block diagram illustrating various portions of computer system (also called distributed data processing system) 100, including: enterprise server computer sub-system 102; client computer sub-systems 104, 106, 108, 110, 112; communication network 114; server computer 200; communication unit 202; processor set 204; input/output (i/o) interface(s) 206; memory device 208; persistent storage device 210; display device 212; external device set 214; random access memory (RAM) device 230; cache memory device 232; workflow program 240 (also sometimes called software 240); and interruption software 242. The operation of interruption software 242 will be discussed in detail, below, in the Operation Of Embodiment(s) sub-section of this DETAILED DESCRIPTION section.

As shown in FIG. 2, computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Software 240 is a representative set of program(s) in the form of a collection of machine readable instructions and data that is used to create, manage and control certain software functions that will be discussed in detail below.

Computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1 and 2, taken together, provide only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 2, computer sub-system 102 is shown as a block diagram with many double arrows. These double arrows (no separate reference numerals) represent a communications fabric, which provides communications between various components of computer sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for computer sub-system 102; and/or (ii) devices external to computer sub-system 102 may be able to provide memory for use by computer sub-system 102.

Software 240 is in many respects representative of the various software of the present invention and is stored in persistent storage 210 for access and/or execution by one or more of the respective computer processor(s) 204, usually through one or more memories of memory 208. Persistent storage 210 is at least more persistent than a signal in transit is, but the persistent storage may, of course, be substantially less persistent than permanent storage. Software 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to sub-system 102, such as client computer sub-systems 104, 106, 108, 110, 112. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with server computer 200. For example, I/O interface(s) 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, software 240, can be stored on such portable computer-readable storage media. In these embodiments the relevant software may (or may not) be loaded, in whole or in part, onto persistent storage device 210 via I/O interface(s) 206. I/O interface(s) 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Operation of Embodiment(S) of the Present Invention

The flowchart and block diagrams in the Figures involved in the following discussion illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
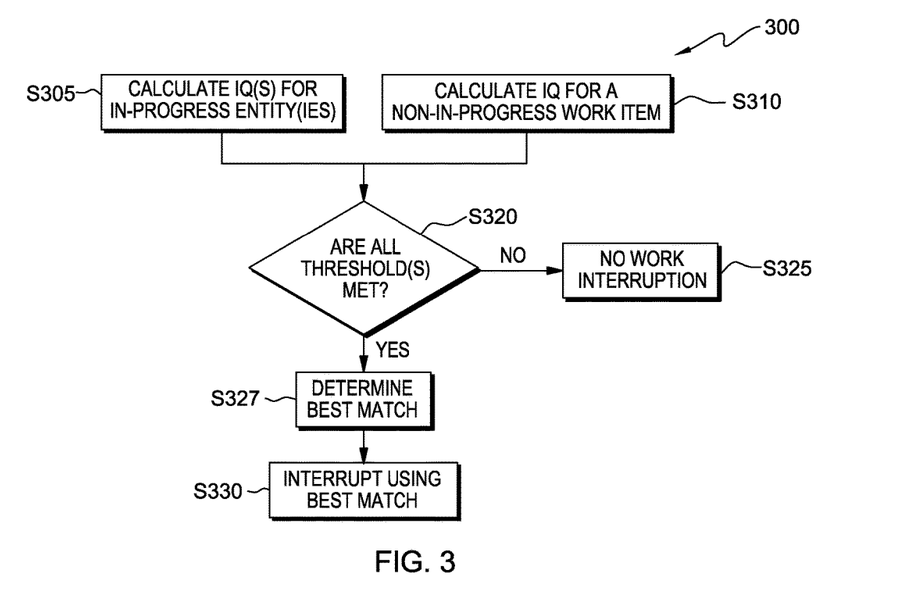
FIG. 3 is a flowchart showing an embodiment of process according to the present invention which is performed by the first embodiment system.
Figure 4:
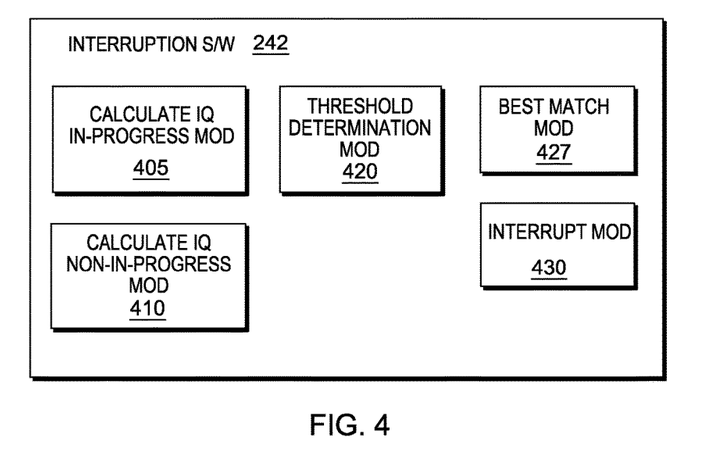
FIG. 4 is a schematic view of a portion of the first embodiment computer system.

A method 300 for controlling workflow, implemented by software running on computer hardware will now be discussed in connection with FIGS. 3 and 4. FIG. 3 shows a flowchart of method 300 and FIG. 4 shows a block diagram of the software used to make it happen.

As shown in FIG. 3, at step S305, calculate interruptibility quotient (IQ) in-progress module (mod) 405 (see FIG. 4) calculates one or more interruptibility quotient(s) relating to an in-progress status work item and/or resource unit(s) that are working on that particular in-progress status work item. This set of interruptibility quotient(s) will herein be referred to as a "set of in-progress interruptibility quotient(s)" (or, more generally, a "set of in-progress interruptibility scalar(s)"). The set of in-progress interruptibility quotient(s) will generally include at least one of the following: (i) one or more resource unit interruptibility quotient(s) based upon the characteristics and/or status of the resource unit(s) working on the in-progress work item; (ii) an interruptibility quotient based upon the characteristics and/or status of the in-progress work item; and/or (iii) an interruptibility quotient based upon both status and/or characteristics of both the in-progress work item and the resource unit(s) working on the in-progress work unit. In this particular embodiment under discussion, the set of in-progress interruptibility quotient includes only a single quotient, and this single quotient is based upon status and/or characteristics of both the in-progress work item and the resource unit(s) working on the in-progress work unit.

At step S310, calculate IQ non-in-progress mod 410 (see FIG. 4) calculates an interruptibility quotient relating to a non-in-progress status (that is, incoming or interrupted status) work item. This non-in-progress work item interruptibility quotient (or, more generally, a "non-in-progress work item interruptibility scalar" is preferably calculated on a scale so that it can be easily compared to the quotient(s) of the set of in-progress interruptibility quotient(s) calculated at step S305.

Processing proceeds from steps S305 and S310 to step S320 where threshold determination mod 420 determines whether all relevant thresholds relating to the set of in-progress interruptibility quotient(s) and to the non-in-progress work item interruptibility quotient are met such that the non-in-progress work item qualifies to replace the in-progress work item. In this particular embodiment 300: (i) the only value subject to a threshold test is the value of the difference between the in-progress interruptibility quotient and the non-in-progress work item interruptibility quotient; (ii) the threshold test is that the in-progress interruptibility quotient minus the non-in-progress work item interruptibility quotient must be greater than a threshold value of zero (0); and (iii) if the difference is not greater than zero then processing proceeds to step S325 because the particular non-in-progress work item under analysis does not qualify to interrupt the in-progress work item under analysis. In one simple variation on this embodiment, the threshold value to be applied to the difference in interruptibility quotients may be made somewhat greater than zero (0) so that work items of approximately equal priority will not be frequently interrupting each other, and interruptions can be reserved as a technique for situations where the potentially interrupting item has a significantly higher priority than the in-progress item.

In alternative embodiments, other types of threshold tests may be used, alternatively, or additionally, to the particular type of threshold test described in the previous paragraph. In embodiments where there is more than one in-progress interruptibility quotient in the set of in-progress interruptibility quotient, then each of these multiple quotients might be separately compared to the non-in-progress interruptibility quotient to determine whether all the respective differences meet respectively applicable difference value thresholds. As a further alternative, the non-in-progress work item interruptibility quotient might be required to be below some predetermined threshold in order to qualify to interrupt any work at all. As a further alternative, each quotient of the set of in-progress quotient(s) might be required to be below or above some predetermined threshold in order to qualify to be interrupted at all by any work at all.

Some embodiments will also apply additional rule-based tests at step S320, in addition to thresholds applied to interruptibility scalars. One representative example, discussed elsewhere in this document, is that the resource unit may be required to be fluent in some predetermined language in order to be interrupted by some given non-in-progress work item. While this language qualification does not relate to the resource unit's interruptibility, it may still be an important criterion as to whether a proposed interruption may be mandated by the software.

If all threshold tests and any other tests are met at step S320, then processing proceeds to step S327 where best match mod 427 (see FIG. 4) determines whether the proposed interruption analyzed at step S320 is the best interruption that could be made, especially when considering other interruptions that might be made, system-wide, involving the non-in-progress work item, the in-progress work item and/or the resource unit(s) working on the in-progress work item. Some embodiments of the present invention may omit step S327. For embodiments that do include step S327, processing steps similar to S305, S310 and S320 may be involved in order to compare other possible interruptions that might be alternatively made at a given time.

Processing proceeds to step S330 where interrupt mod 430 makes the best match interruption. If the non-in-progress work item and in-progress entity(ies) compared at step S320 turned out to be the best match, then it is that particular non-in-progress work item that will interrupt the in-progress work item and associated resource unit(s).

An embodiment of system architecture 1000 for resource interrupts will now be discussed in the following paragraphs with reference to FIGS. 5 to 10.

Figure 5:
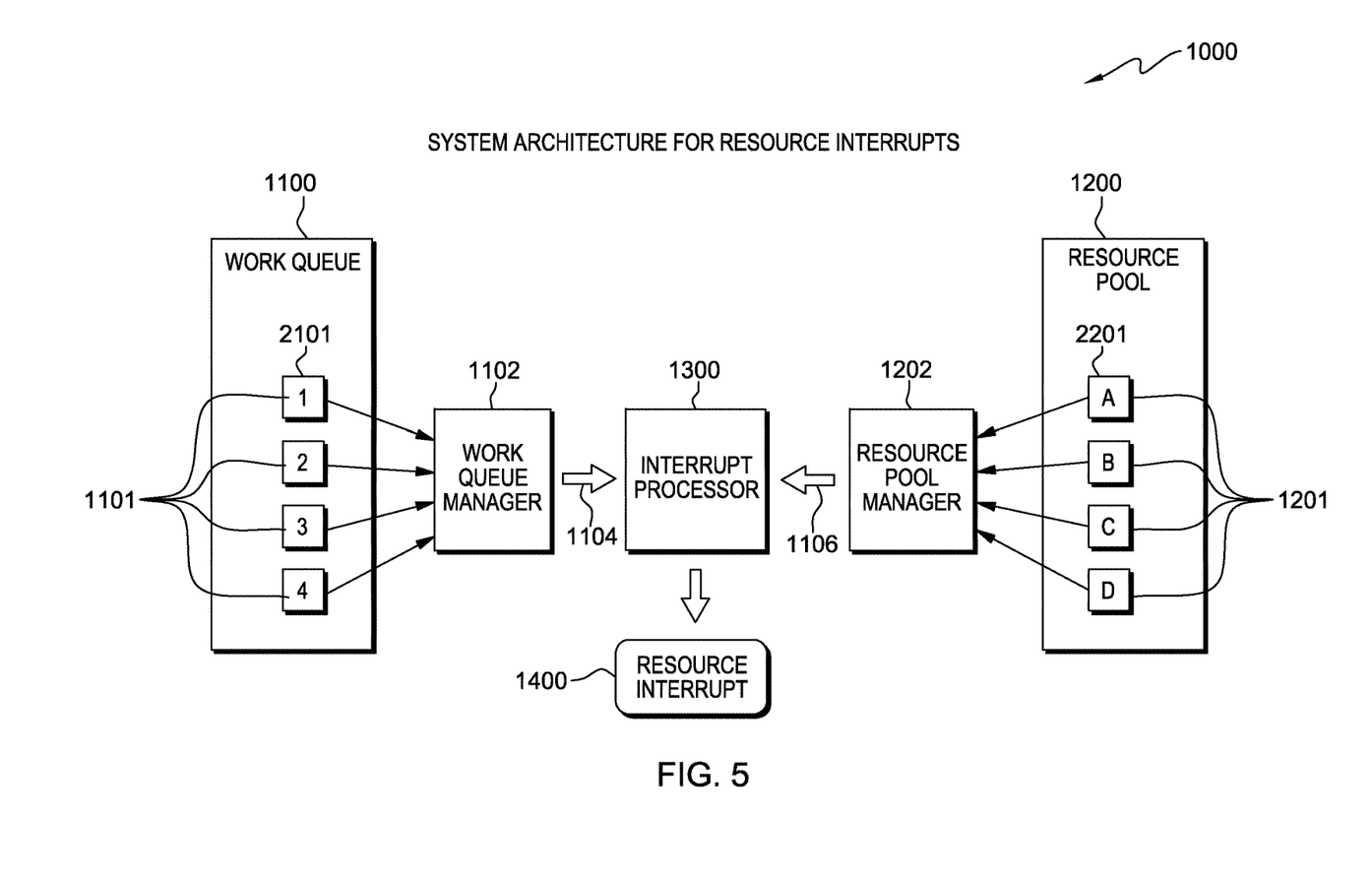
FIG. 5 is a schematic view of a second embodiment of a system according to the present invention.

As shown in FIG. 5, work queue block 1100 includes units of work 1101. As shown in flowchart 3000, the incoming new unit of work is shown at block S3101. New or unassigned units of work (or tasks) 1101 that need to be handled by a group, team, or individual are entered, or queued, into system 1000, as shown at block S3102 of flowchart 3000 of FIG. 10. These units of work can be delivered into the system from a wide range of external sources, including call/problem management, email, phone switch, chat/instant messaging, content management, collaboration databases, etc.

Each unit of work 1101 contains a common set of attributes which can be analyzed by the work management system 1102, to assign resources 1201, to handle the request at the appropriate and/or required timeframe. These common attributes can include: type, source, severity, priority, initiator/requestor, client information, product information, component information, skill(s) required, language(s) required, entitlement or contract terms and conditions, response criteria, expiration, age, life cycle priority curve, etc.

Work queue manager 1102 analyzes all new or unassigned units of work 1101, which have entered into the work management queue 1100. This analysis will apply the business rules against the attributes of each unit of work 1101 and determine the current prioritization of all of the unassigned work items. (Note: per normal workflow, unassigned work items 1101, will be assigned to resources 1201, as these resources complete other work items and become available to handle new work items.

Resource pool 1200 will now be discussed. All known human resources that are eligible to be assigned units of work 1101 are entered into a common electronic pooling system.

Each resource 1201 contains a common set of attributes which can be analyzed by pool management system 1202 to determine their current working state or status. These common attributes can include static attributes such as technical skill set, spoken language(s), physical and logical location(s), work schedule, etc., along with any of the dynamic attributes related to their currently assigned units of work or tasks. These dynamic attributes would include all of the attributes described above in a unit of work 1101, above, and will be critical (in this particular embodiment) in determining the eligibility of a resource to be interrupted from their current work or to be assigned an additional unit of work to handle.

Resource pool manager 1202 analyzes all of the resources 1201 from the resource pool 1200, which may be qualified and/or eligible to handle new or unassigned work item(s) from the work management system 1102. This is shown at block 53202 of flowchart 3000 of FIG. 10.

Figure 6:
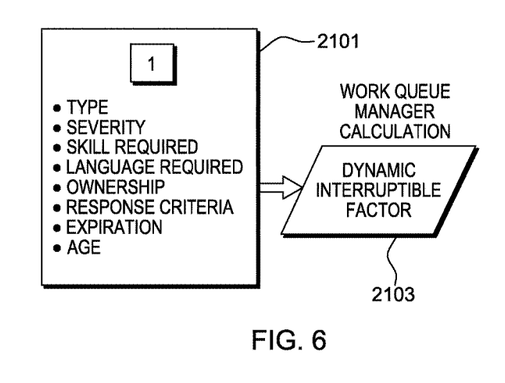
FIG. 6 is a diagram helpful in understanding operation of the second embodiment system.

As shown in FIGS. 5 and 6, dynamic interruptible factor 2103 (see FIG. 6) is calculated based upon multiple possible inputs. This calculation is shown at block 53103 of flowchart 3000 of FIG. 10. These same or similar business rules applied by work queue manager 1102 (see FIG. 5) will also be used during the analysis to determine when a first unit of work 2101 (see FIG. 6) will become interrupt-eligible to potentially be assigned to a currently assigned or busy resource 1201 (see FIG. 5).

Figure 7:
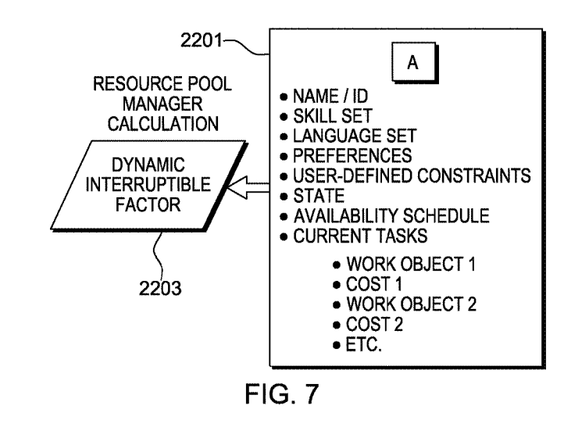
FIG. 7 is a diagram helpful in understanding operation of the second embodiment system.

As shown in FIGS. 5 and 7, dynamic resource available interruptibility factor 2203 (see FIG. 7) is calculated based upon multiple possible inputs. These same or similar business rules applied by the resource pool manager 1202 (see FIG. 5) will also be used during the analysis to determine whether a first resource 2201 (see FIG. 7) is interrupt-eligible to potentially be interrupted from its current unit of work, or whether additional units of work can be assigned to it. This factor 2203 (see FIG. 7) would be based on the attributes contained in the currently assigned unit(s) of work and is similar in nature to the factor 2103 (see FIG. 6) assigned to the new or unassigned units of work as described above.

Figure 8:
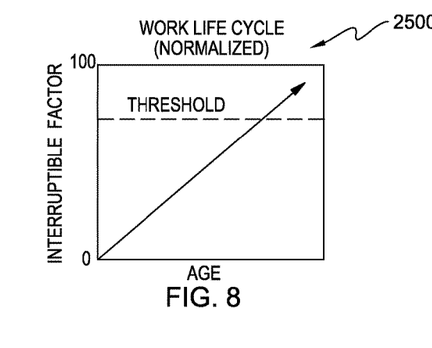
FIG. 8 is a graph helpful in understanding operation of the second embodiment system.

As shown in graph 2500 of FIG. 8, each unit of work has a life cycle from the time it enters the work queue 1100 (see FIG. 5) to the time is has been given to a resource 1201. Business rules define the priority of the work based on its attributes or by its terms and conditions for expiration over a period of time. In this system, a threshold defines when a unit of work becomes high enough priority such that it is interrupt-eligible. Over time, when factor 2103 (see FIG. 6) surpasses the threshold, then it becomes eligible to interrupt a resource 1201.

Figure 9:
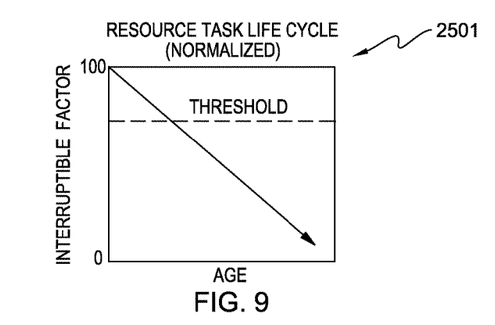
FIG. 9 is a graph helpful in understanding operation of the second embodiment system.

As shown in graph 2501 of FIG. 9, each resource's tasks have a life cycle from the time it is given to one of the resources 1201 (see FIG. 5) to the time the task is completed. Business rules and the task attributes determine over time whether the task becomes interruptible or not. In this system, a threshold defines when a task becomes interrupt-eligible. Over time, when the factor 1203 (see FIG. 6) falls below the threshold, then it becomes eligible to receive one of the units of work 1101 (see FIG. 5) that is qualified as interrupt-eligible.

Figure 10:
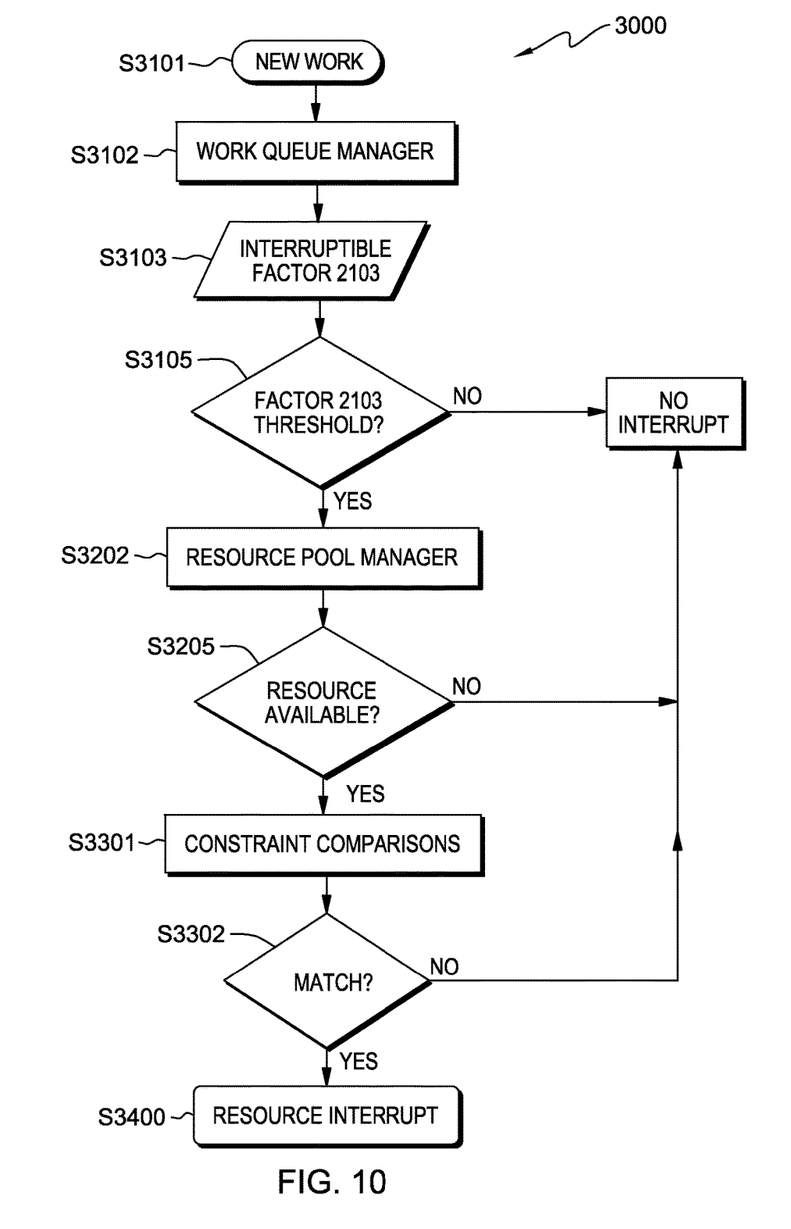
FIG. 10 is a flowchart showing an embodiment of process according to the present invention which is performed by the second embodiment system.

As shown in block S3105 of flowchart 3000 of FIG. 10, it is determined whether interruptibility factor 2103 (discussed above) for first unit of work 2101 (see FIG. 6) is greater than its relevant threshold. When factor 2103 calculated for first unit of work 2101 has exceeded its defined interruptibility threshold during its life cycle (as shown in FIG. 8), then the work queue manager will mark the first unit of work as interrupt-eligible to potentially interrupt currently assigned resources who may be working on lower priority units or work or tasks. An unassigned unit of work could exceed this threshold due to the terms and conditions of a contract, client sensitivity issues, severity/priority of the request, upcoming availability of critical resources, etc.

As shown in block S3205 of flowchart 3000 of FIG. 10, it is determined whether a resource is available. When a first resource 2201 (see FIG. 7) has a current task that has fallen below its interruptibility threshold during its life cycle (see graph 2501 at FIG. 9), then resource pool manager 1202 (see FIG. 5) will mark first resource 2101 as interrupt-eligible to receive a unit of work in an interrupt-eligible state of higher priority.

As shown in FIG. 5, interrupt processor 1300 receives: (i) interrupt candidates trough path 1104 from work queue manager 1102; and (ii) interruptible resources through path 1106 from resource pool manager 1202. Interrupt processor 1300: (i) analyzes the attributes of any interrupt-eligible new or unassigned units or work; (ii) uses business rules to compare these units of work against the static and dynamic attributes of any interrupt-eligible resources; and (iii) uses business rules to compare these units of work against any additional resource constraints to determine a pool of busy, but interrupt-eligible, resources.

As shown in block S3302 of flowchart 3000 of FIG. 10, all resources are analyzed by processor 1300 (see FIG. 5) to determine a match. This match determination is based in part upon the constraints (for example, skills, languages, etc.) and/or eligibility considerations (for example, new work priority can interrupt or be added to current work) determined in block S3301 of flowchart 3000 of FIG. 10.

As shown in FIG. 5, resource interrupt block S3400 performs the work interruption based upon the best match. If one or more interrupt-eligible resources 1201 are found which match the criteria to handle the new or unassigned unit of work 2101, then business rules will be utilized to determine the best matching resource and the resource will be 'interrupted' or assigned the unit of work. The interrupt process further utilizes business processes for interrupting a resource; one in which the resource is immediately assigned the new task, or one in which the resource is given the choice to accept the interrupt or not.

IV. Definition(s)

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: non-exclusive or; for example, A and/or B means that: (i) A is true and B is false; or (ii) A is false and B is true; or (iii) A and B are both true.

What is claimed is:

1. A method for controlling workflow in an environment including non-in-progress work items and in-progress work items, which in-progress work items are being worked upon by currently assigned resource units, comprising:
receiving an in-progress data set including information indicative of: (i) a plurality of in-progress work items that are currently being worked by a plurality of resource units, and (ii) respectively associated interruptibility values that respectively reflect a relative priority of the respectively associated in-progress work item, wherein each of the respectively associated interruptibility values is a hybrid interruptibility value that is dependent upon both of the characteristics of the respectively associated in-progress work item and the characteristics of the resource unit currently working on the respectively associated in-progress work item;

receiving a plurality of newly-received work item data sets including information indicative of not-in-progress work items that are not yet in progress;

for each given not-in-progress work item, calculating an interruptibility value that reflects relative priority of the given not-in-progress work items;

determining, by a workflow interruption module, whether at least one of the not-in-progress work items is qualified to interrupt at least one of the plurality of in-progress work items based at least on whether the interruptibility value of the at least one not-in-progress work item being lower than the interruptibility value of the a at least one in-progress work item by a predefined interruptibility threshold;

in response to determination that none of the plurality of not-in-progress items are qualified to interrupt the plurality of in-progress work items, dynamically re-calculating the interruptibility values for the in-progress and the not-in-progress work items to obtain re-calculated interruptibility values respectively corresponding to the in-progress and not-in-progress work items;

determining, by the workflow interruption module, that a first set of interrupting not-in-progress work item(s) should interrupt a first set of to-be-interrupted in-progress work item(s) based upon the re-calculated interruptibility values for the in-progress work items and the not-in-progress work items meeting a first threshold and second threshold respectively, wherein the first threshold defines when a not-in-progress work item becomes high enough priority such that it becomes interrupt-eligible, and the second threshold defines when an in-progress work item becomes interrupt-eligible such that a currently assigned resource unit can be interrupted to work on another work unit;

subsequent to the determination that the first set of interrupting not-in-progress work item(s) should interrupt the first set of to-be-interrupted in-progress work item(s), interrupting the first set of to-be-interrupted in-progress work item(s) by the first set of interrupting not-in-progress work item(s), so that: (i) the first set of interrupting not-in-progress work item(s) are changed to in-progress work item(s) as a current first set of work-in-progress work items to be worked by a first set of resource units of the first set of to-be-interrupted in-progress work item(s), and (ii) the first set of to-be-interrupted in-progress work item(s) are changed to not-in-progress work item(s); and working, by the first set of resource unit(s), on the current first set of work-in-progress work items.

2. The method of claim 1 wherein the determination that a first set of interrupting not-in-progress work item(s) should interrupt a first set of to-be-interrupted in-progress work item(s) based upon the re-calculated interruptibility values for the in-progress work items and the not-in-progress work items is based upon comparisons that use a first nonzero interruptibility threshold value.

3. The method of claim 1 wherein re-calculated interruptibility values include a first interruptibility value corresponding to a not-in-progress work items where the recalculated first interruptibility value increases upon re-calculation due to aging of the respectively corresponding not-in-progress work item.

4. The method of claim 1 wherein the first set of interrupting not-in-progress work items includes at least one of the following types of work items: live calls, electronic problem records, chats, discussion updates and/or knowledge work.

5. A computer product for controlling workflow in an environment including non-in-progress work items and in-progress work items, which in-progress work items are being worked upon by currently assigned resource units, comprising:

a non-transitory machine readable storage device; and computer code stored on the non-transitory machine readable storage device, with the computer code including instructions for causing a processor(s) set to perform operations including the following:

receiving an in-progress data set including information indicative of: (i) a plurality of in-progress work items that are currently being worked by a plurality of resource units, and (ii) respectively associated interruptibility values that respectively reflect a relative priority of the respectively associated in-progress work item, wherein each of the respectively associated interruptibility values is a hybrid interruptibility value that is dependent upon both of the characteristics of the respectively associated in-progress work item and the characteristics of the resource unit currently working on the respectively associated in-progress work item, receiving a plurality of newly-received work item data sets including information indicative of not-in-progress work items that are not yet in progress, for each given not-in-progress work item, calculating an interruptibility value that reflects relative priority of the given not-in-progress work items, determining, by a workflow interruption module, whether at least one of the not-in-progress work items is qualified to interrupt at least one of the plurality of in-progress work items based at least on whether the interruptibility value of the at least one not-in-progress work item being lower than the interruptibility value of the a at least one in-progress work item by a predefined interruptibility threshold, in response to determination that none of the plurality of not-in-progress items are qualified to interrupt the plurality of in-progress work items, dynamically re-calculating the interruptibility values for the in-progress and the not-in-progress work items to obtain re-calculated interruptibility values respectively corresponding to the in-progress and not-in-progress work items, determining, by the workflow interruption module, that a first set of interrupting not-in-progress work item(s) should interrupt a first set of to-be-interrupted in-progress work item(s) based upon the re-calculated interruptibility values for the in-progress work items and the not-in-progress work items meeting a first threshold and second threshold respectively, wherein the first threshold defines when a not-in-progress work item becomes high enough priority such that it becomes interrupt-eligible, and the second threshold defines when an in-progress work item becomes interrupt-eligible such that a currently assigned resource unit can be interrupted to work on another work unit, subsequent to the determination that the first set of interrupting not-in-progress work item(s) should interrupt the first set of to-be-interrupted in-progress work item(s), interrupting the first set of to-be-interrupted in-progress work item(s) by the first set of interrupting not-in-progress work item(s), so that: (i) the first set of interrupting not-in-progress work item(s) are changed to in-progress work item(s) as a current first set of work-in-progress work items to be worked by a first set of resource units of the first set of to-be-interrupted in-progress work item(s), and (ii) the first set of to-be-interrupted in-progress work item(s) are changed to not-in-progress work item(s), and working, by the first set of resource unit(s), on the current first set of work-in-progress work items.

6. The product of claim 5 wherein the determination that a first set of interrupting not-in-progress work item(s) should interrupt a first set of to-be-interrupted in-progress work item(s) based upon the re-calculated interruptibility values for the in-progress work items and the not-in-progress work items is based upon comparisons that use a first nonzero interruptibility threshold value.

7. The product of claim 5 wherein re-calculated interruptibility values include a first interruptibility value corresponding to a not-in-progress work items where the recalculated first interruptibility value increases upon re-calculation due to aging of the respectively corresponding not-in-progress work item.

8. The product of claim 5 wherein the first set of interrupting not-in-progress work items includes at least one of the following types of work items: live calls, electronic problem records, chats, discussion updates and/or knowledge work.

9. A computer system for controlling workflow in an environment including non-in-progress work items and in-progress work items, which in-progress work items are being worked upon by currently assigned resource units, comprising:

a processor(s) set;

a non-transitory machine readable storage device; and computer code stored on the non-transitory machine readable storage device, with the computer code including instructions for causing the processor(s) set to perform operations including the following:

receiving an in-progress data set including information indicative of: (i) a plurality of in-progress work items that are currently being worked by a plurality of resource units, and (ii) respectively associated interruptibility values that respectively reflect a relative priority of the respectively associated in-progress work item, wherein each of the respectively associated interruptibility values is a hybrid interruptibility value that is dependent upon both of the characteristics of the respectively associated in-progress work item and the characteristics of the resource unit currently working on the respectively associated in-progress work item, receiving a plurality of newly-received work item data sets including information indicative of not-in-progress work items that are not yet in progress, for each given not-in-progress work item, calculating an interruptibility value that reflects relative priority of the given not-in-progress work items, determining, by a workflow interruption module, whether at least one of the not-in-progress work items is qualified to interrupt at least one of the plurality of in-progress work items based at least on whether the interruptibility value of the at least one not-in-progress work item being lower than the interruptibility value of the a at least one in-progress work item by a predefined interruptibility threshold, in response to determination that none of the plurality of not-in-progress items are qualified to interrupt the plurality of in-progress work items, dynamically re-calculating the interruptibility values for the in-progress and the not-in-progress work items to obtain re-calculated interruptibility values respectively corresponding to the in-progress and not-in-progress work items, determining, by the workflow interruption module, that a first set of interrupting not-in-progress work item(s) should interrupt a first set of to-be-interrupted in-progress work item(s) based upon the re-calculated interruptibility values for the in-progress work items and the not-in-progress work items meeting a first threshold and second threshold respectively, wherein the first threshold defines when a not-in-progress work item becomes high enough priority such that it becomes interrupt-eligible, and the second threshold defines when an in-progress work item becomes interrupt-eligible such that a currently assigned resource unit can be interrupted to work on another work unit, subsequent to the determination that the first set of interrupting not-in-progress work item(s) should interrupt the first set of to-be-interrupted in-progress work item(s), interrupting the first set of to-be-interrupted in-progress work item(s) by the first set of interrupting not-in-progress work item(s), so that: (i) the first set of interrupting not-in-progress work item(s) are changed to in-progress work item(s) as a current first set of work-in-progress work items to be worked by a first set of resource units of the first set of to-be-interrupted in-progress work item(s), and (ii) the first set of to-be-interrupted in-progress work item(s) are changed to not-in-progress work item(s), and working, by the first set of resource unit(s), on the current first set of work-in-progress work items.

10. The system of claim 9 wherein the determination that a first set of interrupting not-in-progress work item(s) should interrupt a first set of to-be-interrupted in-progress work item(s) based upon the re-calculated interruptibility values for the in-progress work items and the not-in-progress work items is based upon comparisons that use a first nonzero interruptibility threshold value.

11. The system of claim 9 wherein re-calculated interruptibility values include a first interruptibility value corresponding to a not-in-progress work items where the recalculated first interruptibility value increases upon re-calculation due to aging of the respectively corresponding not-in-progress work item.

12. The system of claim 9 wherein the first set of interrupting not-in-progress work items includes at least one of the following types of work items: live calls, electronic problem records, chats, discussion updates and/or knowledge work.

* * * * *